US005772934A

United States Patent [19]

MacFadden

[11] Patent Number: 5,772,934
[45] Date of Patent: Jun. 30, 1998

[54] PROCESS TO PRODUCE LITHIUM-POLYMER BATTERIES

[75] Inventor: Kenneth Orville MacFadden, Highland, Md.

[73] Assignee: W. R. Grace & Co.-Conn., New York, N.Y.

[21] Appl. No.: 653,173

[22] Filed: May 24, 1996

[51] Int. Cl.$^6$ .................................................. H01M 6/18
[52] U.S. Cl. ........................... 264/42; 264/45.9; 264/48; 264/344; 429/190; 429/192; 429/194
[58] Field of Search ................................ 264/49, 48, 344, 264/129, 42, 45.9; 429/128, 188, 192, 190, 194

[56] References Cited

U.S. PATENT DOCUMENTS

| | | | |
|---|---|---|---|
| 4,654,281 | 3/1987 | Anderman et al. | 429/209 |
| 4,659,528 | 4/1987 | Plowman et al. | 264/344 |
| 4,731,310 | 3/1988 | Anderman et al. | 429/194 |
| 4,735,875 | 4/1988 | Anderman et al. | 429/194 |
| 4,791,037 | 12/1988 | Anderman | 429/196 |
| 4,818,643 | 4/1989 | Cook et al. | 429/188 |
| 4,876,115 | 10/1989 | Raistrick | 427/115 |
| 5,013,619 | 5/1991 | Cook et al. . | |
| 5,102,752 | 4/1992 | Hope et al. . | |
| 5,143,805 | 9/1992 | Anderman et al. | 429/217 |
| 5,213,722 | 5/1993 | Iwasaki et al. | 264/344 |
| 5,219,679 | 6/1993 | Abraham et al. | 429/192 |
| 5,296,318 | 3/1994 | Gozdz et al. | 429/192 |
| 5,348,824 | 9/1994 | Duval . | |
| 5,460,903 | 10/1995 | St. Aubyn Hubbard et al. . | |
| 5,518,838 | 5/1996 | Bai et al. | 429/192 |
| 5,523,181 | 6/1996 | Stonehart et al. | 429/192 |
| 5,538,811 | 7/1996 | Kanbara et al. | 429/192 |
| 5,597,659 | 1/1997 | Morigaki et al. | 429/190 |
| 5,654,112 | 8/1997 | Itou et al. | 429/194 |

*Primary Examiner*—Allan R. Kuhns
*Attorney, Agent, or Firm*—Howard J. Troffkin

[57] ABSTRACT

A polymer bonded sheet product suitable for use as an electrode in a non-aqueous battery system. A porous electrode sheet is impregnated with a solid polymer electrolyte, so as to diffuse into the pores of the electrode. The composite is allowed to cool, and the electrolyte is entrapped in the porous electrode. The sheet products composed have the solid polymer electrolyte composition diffused into the active electrode material by melt-application of the solid polymer electrolyte composition into the porous electrode material sheet. The solid polymer electrolyte is maintained at a temperature that allows for rapid diffusion into the pores of the electrode. The composite electrolyte-electrode sheets are formed on current collectors and can be coated with solid polymer electrolyte prior to battery assembly. The interface between the solid polymer electrolyte composite electrodes and the solid polymer electrolyte coating has low resistance.

19 Claims, 1 Drawing Sheet

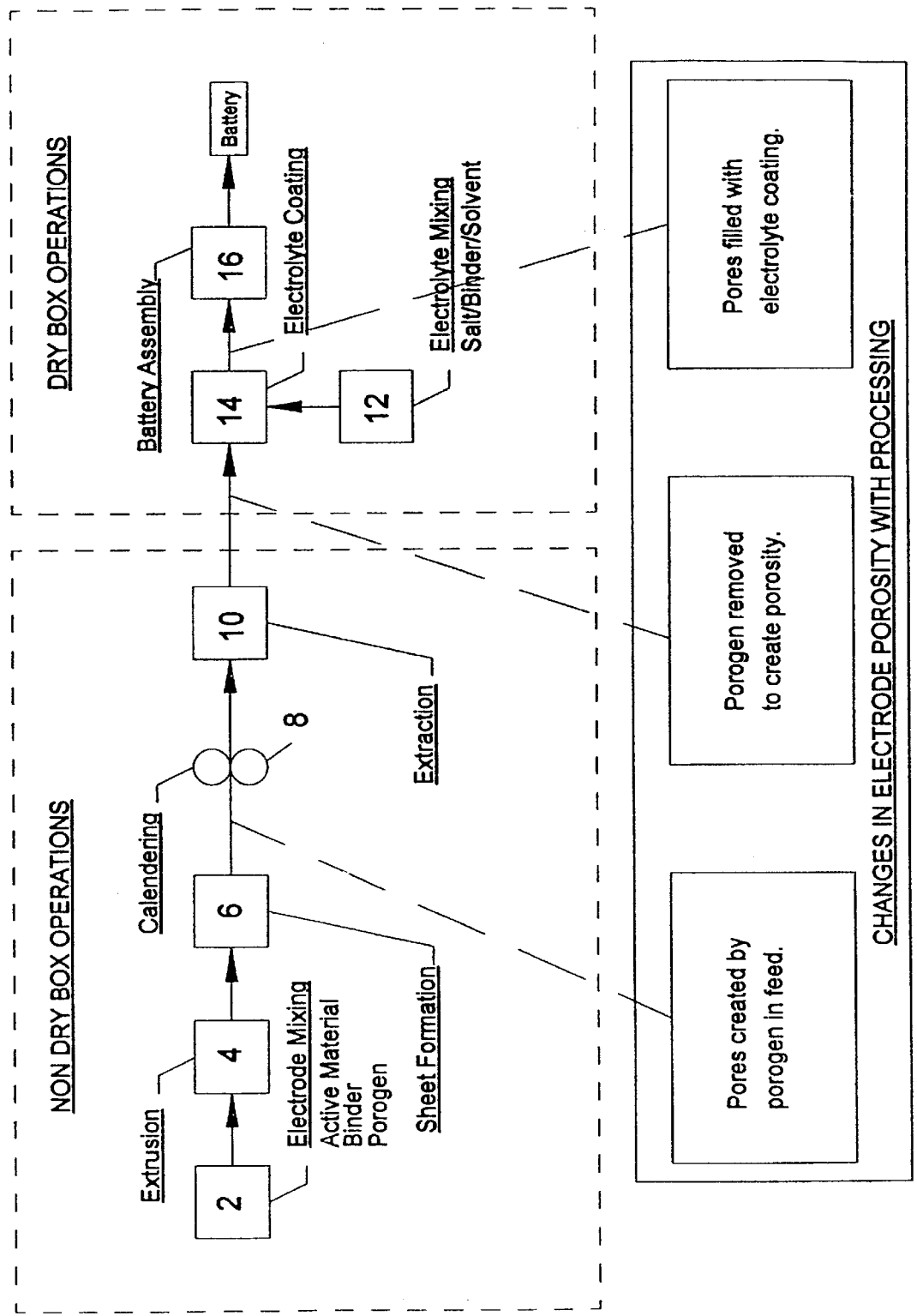

PROCESS TO PRODUCE LITHIUM-POLYMER BATTERIES

This invention was made with Government support under Contract DE-FC02-91CE50336 awarded by the United States Department of Energy. The Government has certain rights in this invention.

BACKGROUND OF THE INVENTION

1. Field of the Invention

The present invention relates to solid polymer electrolyte-electrode composites useful in non-aqueous batteries, and to battery systems containing such composites. More specifically, the present invention relates to electrolyte-electrode composites fabricated by preparing a porous electrode and applying a fluidized solid polymer electrolyte to diffuse into the pores of the electrode. The composite is allowed to cool, and the electrolyte is entrapped in the porous electrode.

2. Description of the Related Art

Storage batteries have a configuration composed of at least one pair of electrodes of opposite polarity, generally arranged in a series of adjacent electrodes of alternating polarity. The current flow between electrodes is maintained by an electrolyte composition capable of carrying ions between electrode pairs.

Non-aqueous batteries have certain distinct advantages over other types of storage batteries. They use light-weight metals, such as the alkali metals as, for example, lithium. The metals are preferably in forms that are capable of intercalating with the conductive material, such as carbon. Typical metals and metal compounds include alkali metals and alkali metal compounds, such as lithium metal, lithium oxides, lithium-aluminum alloys and the like, which are at the far end of the electromotive series. These batteries have the potential for providing much higher specific (gravimetric) energy and volumetric energy densities (capacity per unit weight and volume, respectively) than other types of batteries.

The improved potential, in part, is due to the low atomic weight of the metals utilized, and the high potential for forming a battery in conjunction with suitable positive electrodes far removed in the electromotive series from the light weight metal (alkali metal) electrode. The battery can be formed in any conventional physical design, such as cylindrical, rectangular or disc-shaped "button" cells, normally of a closed cell configuration.

The battery components include positive electrodes, negative electrodes, and an insulating material capable of permitting ionic conductivity such as porous separator sheet or a solid polymer electrolyte located between the electrodes. Batteries formed of these components can be in the form of alternating plates in a sandwich design, or of a continuously spirally-wound "jelly-roll" design, as are well known.

Both positive and negative electrodes have been formed by processing compositions composed of electrochemically active and electrolytically conducive materials with an inert polymer (e.g. polyolefins, polytetrafluoroethylenes and the like) capable of bonding the materials into the desired shaped electrode. For example, polymer bonded electrodes are conventionally formed by mixing the solid, active particulate components together with a high temperature stable polymer, such as poly(tetrafluoroethylene), processed into the desired shape by pressing and then subjected to heat to provide a sintered, fused porous product. Alternately, the active materials are mixed with a thermoplastic polymer, such as a polyolefin together with an inert liquid, such as a hydrocarbon oil and then shaped into a sheet product, by pressing, extrusion or the like. The oil or other liquid is then removed by extraction to provide a resultant porous sheet product.

The polymer bonded electrodes are of a porous design which permit electrolyte liquid to enter into the internal porosity and permit ionic transfer to more readily occur with the electrode's internally positioned active material.

Electrolytes found useful in the present high energy battery systems can be in the form of a gel or solid polymer electrolyte (SPE) such as described in U.S. Pat. No. 5,219,679 to Abraham et al., the disclosure of which is incorporated herein by reference. Such SPE systems are composed, in general, of a polymer matrix in which ions are conducted and which contain lithium ion ($Li^+$) exchange complexes. The complexes utilize lithium salts that are well known in the art of lithium battery production. The lithium salts commonly used include $LiPF_6$, $LiAsF_6$, $LiCF_3SO_3$, and $LiClO_4$, for example.

Liquids that have been utilized effectively in making the ion-exchange complexes of the SPE include the organic solvents, and especially those that are aprotic, i.e., not prone to contributing a proton, such as ethylene carbonate, propylene carbonate, dimethyl carbonate, diethyl carbonate, dimethyl adipate, tetramethylene sulphone, γ-butyrolactone, dimethylformamide, dioctyl phthalate, dibutyl phthalate and the like.

Polymers typically used in SPE's include polyacrylonitrile (PAN), poly(tetraethylene glycol diacrylate) (PEGDA), poly(vinylidene difluoride) (PVDF) and poly(vinyl pyrrolidone) (PVP).

The known solid polymer electrolytes typically have been used to make batteries by sandwiching preformed sheet-like members of SPE's between a cathode and an anode, as shown, for example, in U.S. Pat. No. 4,818,643, issued to Cook et al., which is incorporated herein by reference. Therein, a solid polymer electrolyte is sandwiched between a composite cathode disc and a lithium metal anode. The composite cathode disc is pressed from a mixture of polyethylene oxide and active cathode material.

In forming the battery, additional solvent may be added to the system to permit electrolyte solvent introduction into the pore volume of the electrode members.

Disadvantageously, high impedances are formed at the interfaces between the various layers, which are essentially plane surfaces. Accordingly, efforts have been made in the prior art to enhance the adhesion properties of the various cell layers. This is done, for example, by providing surface asperities, typically greater than one micron.

The known processes are disadvantageous due to insufficient adhesion and high resistance/impedance at the interface between the electrodes and the electrolytes, which continues to be a problem in batteries resulting from the processes. In addition, the known processes are disadvantageous in that many steps must be completed under dry-atmosphere conditions.

Accordingly, the need exists for an improved lithium battery having reduced resistance at the interfaces between electrolytes and electrodes. In addition, the need exists for methods of producing battery electrodes for such batteries that require a reduced number of process steps, and a reduced number of process steps that must be carried out under dryatmosphere conditions.

SUMMARY OF THE INVENTION

The present invention overcomes the deficiencies of the prior art, such as those noted above, by providing a composite electrolyte-electrode that includes a solid polymer electrolyte diffused into a porous electrode material. The process generally involves formation of a porous electrode material, melting a solid polymer electrolyte composition, and applying the melted composition to at least one surface of the electrodes material to cause it to impregnate therein. The solid polymer electrolyte has been found to diffuse into the pores of the electrode material to form the composite electrolyte-electrodes. The present invention also includes electrodes formed by the process, and battery cells made with the composite electrolyte-electrodes.

Advantageously, the solid polymer electrolyte applied by the present process comes into more intimate contact with the active electrode material to form the composite electrolyte-electrodes. Both anodes and cathodes can be fabricated by the process. The anodes and cathodes thus formed can be assembled directly into batteries.

In addition the solid polymer electrolyte containing hygroscopic lithium salts can be added to the final step, thus minimizing the amount of processing performed in a dry atmosphere.

BRIEF DESCRIPTION OF THE FIGURE

FIG. 1 is a block flow diagram of a production process according to a preferred embodiment of the present invention.

DETAILED DESCRIPTION OF THE INVENTION

The present process provides a polymer-bonded electrode/SPE composite product which has been found to have improved impedance (lower impedance) due to the intimate contact between the SPE and the active electrode material located both internally and at the surface of the electrode structure. Further, the present process provides a means of fabricating battery components and resultant cell structures under ambient conditions for a portion of formation process, thus alleviating the conventional dry-atmosphere conditions during said portion.

Porous polymer-bonded electrodes are initially formed by conventional methods, such as those disclosed in U.S. Pat. Nos. 5,143,805; 4,791,037; 4,654,281; 4,735,875; and 4,731,310 to Anderman et al. which teachings are incorporated herein by reference. The electrodes generally comprise at least one microporous sheet and current collector composed of conductive material in intimate contact with each microporous sheet. The microporous sheet is a free-standing sheet composed of 70–98 wt. % electrochemically active and electrically conductive particles and 2–30 wt. % polyethylene. The electrochemically active particles comprise a metal chalcogenide having a metal selected from Ti, Zr, Hf, Nb, Cu, Fe, Ta, V, Mn, Cr, Co, Ni and mixtures of these metals alone or together with intercalated metals, such as lithium or sodium and up to 30 wt. % conductive particles, such as carbon of particle size 1–100 nm. The polyethylene has molecular weight of about 150,000 to 5,000,000. The electrode may contain up to 5 wt. % organic plasticizer.

The porous electrodes contemplated herein can be formed by various methods known in the prior art. Typically, the electrodes are formed by mixing electrochemically active material with electrically conductive electrode materials, a binder and a porogen. The porogen is removed subsequently to create porosity.

Porous cathodic electrodes according to the invention preferably utilize a metal chalcogenide as the electrochemically active material. Preferred chalcogenides are alkali metal (e.g. lithium) salts of manganese oxides, cobalt oxides, vanadium oxides, nickel oxides or mixed oxides and mixtures thereof. The most preferred are lithium manganese dioxide ($LiMn_2O_4$) or overlithiated manganese oxides. The preferred conductive material may be a carbon black, such as acetylene black, which is mixed with the active material in the cathode.

The active electrode material suitable for producing anodes of the present invention are preferably carbons capable of having lithium intercalated within the crystal or other structure of the carbon material. The preferred forms of carbon include graphite and coke. The carbon preferably is finely ground. The active electrode materials preferably are in the form of a dry particulate.

The binder used in forming the electrode is a thermoplastic polymeric material having a melting point preferably above about 150° C. The specific polymer will depend on the desired electrode design. The preferred polymers are high temperature melting point thermoplastic polymers, such as polyolefins as, for example homopolymers of polyethylene, polypropylene and the like and copolymers thereof which have been formed with other ethylenically polymerizable monomers, such as butadiene, pentadiene, acrylates, acrylonitrile and the like.

A porogen, such as a hydrocarbon oil, is included in the electrode mix. The porogen is subsequently removed to form the pores in the electrode.

The electrode is formed by conventional means in which the electrically conductive material, electrochemically active material, binder and the porogen are mixed and shaped into a sheet product by pressing, extrusion or the like. The sheet product may be further processed to draw it down or subject it to calender rolls to provide the desired thickness (normally 2 to 50 mils) and then the porogen is removed such as by contacting the sheet product with a material which a solvent for the porogen and a nonsolvent for the remaining components. These operations are normally conducted under ambient conditions to provide a porous electrode structure.

In accordance with the present invention, the formed porous electrode sheet product is contacted with a solid polymer electrolyte gel composition which is heated sufficiently to provide a fluid, low viscosity material. The exact temperature of the SPE at application will depend upon its specific composition and resultant physical characteristics. The application temperature should be high enough to provide a low viscosity, fluid material at a temperature which is lower than the degradation temperature of the components forming both the SPE and the electrode to which it is to be applied. Further, it must be lower than the deformation temperature of the recipient electrode. Typical temperatures range from about 80° C. to about 140° C. with from about 100° C. to 140° C. being preferred.

The SPE materials useful in the present invention are high viscosity substantially solid (capable of retaining its form) materials at ambient and normal operating conditions of the battery and are capable of being low viscosity, fluid materials at elevated, nondegradation temperatures. The SPE is separately formed, heated to a temperature to cause the SPE to be fluid and applied to at least one surface of the previously formed, porous electrode sheet material to cause it to impregnate into and substantially fill the electrode's pore volume. Whether the SPE is applied to one or to both major surfaces of the electrode will depend on the electrode's design. If a current collector is internally located in the interior of the electrode, the SPE may be applied on one or both surfaces. If the current collector is located on one surface of the electrode, the SPE will be applied to he opposite major surface.

The SPE can be applied by any conventional means. Preferably the SPE fluid is applied directly to the electrode surface and doctored with a knife blade. The SPE is thus caused to enter and occupy the pore volume of the electrode. The SPE can be applied in a single or, optionally, a multi-application process.

The solid polymer electrolyte (SPE) which are useful in the present process includes a salt, a binder, and liquid. Polymers such as polyethylene oxide, polyacrylonitrile (PAN) or polyvinylidene fluoride (PVDF) or the like, including suitable copolymer systems, may be used. Of the known lithium salts, such as those noted above, $LiPF_6$ is most preferred. Of the liquids noted above, preferably ethylene carbonate, propylene carbonate, or a mixture of the two, in ratio of 70:30 to 30:70 and most preferably 50:50 would be utilized.

The solid polymer electrolyte components are present in the following amounts: polymer in from about 10 to 20 weight percent; liquid in from about 65 to 75 weight percent and salt in from bout 5 to 12 weight percent based on the SPE total weight.

Once the composite electrolyte-electrode has been formed, it is ready to be assembled with an electrode of opposite polarity into a battery cell. Optionally, one or both of the electrodes can be further coated with additional solid polymer electrolyte composition to provide an electrical insulator between electrodes of opposite polarity. The solid polymer electrolyte composition is similar to that described above used to melt-coat the porous electrode. Because the solid polymer electrolyte used in the initial application to enter the pore volume of the electrode is the same or similar to that applied as the electrical insulator/electrolyte coating on at least one major surface of the resultant composite product, the impedance normally associated with interface incompatibility is substantially alleviated.

Other features and advantages of the present invention will become apparent from the following description of the invention, which refers to the drawing.

Referring to FIG. 1, a porous electrode material, including an active electrode material, a binder, and a porogen, are initially mixed 2, and then extruded 4. Electrode sheets are formed at stage 6. Pores are created in the sheet by the porogen in the feed. The porous electrode can be formed in various ways known in the art. For example, a pore former such as a hydrocarbon oil, can be included in the electrode mix.

The composition optionally can also include additives, such as dispersants, colorants and the like to improve processing and the characteristics of the final product.

Subsequently, the sheet is calendered at stage 8, and subjected to an extraction process 10. As a result of the extraction, the porogen is removed, leaving pores in the electrode sheet. During extrusion, the pore former can be removed using a solvent, for example. Advantageously, steps 2 through 10 can be performed in an ambient atmosphere, i.e., without using a dry-atmosphere environment. Prior to extraction, the electrode can be coated onto a current collector, which can be a mesh material to allow extraction to take place through the current collector.

The remainder of the process preferably is done in a dry-atmosphere environment. Prior to being introduced into this environment, the electrode may be subjected to heat (e.g. an air oven) to remove any trace water. A solid polymer electrolyte is mixed at stage 12. The solid polymer electrolyte includes a salt, a binder and a solvent. The solid polymer electrolyte composition is applied at stage 14 in a manner to cause it to impregnate the pore volume of the porous electrode.

The solid polymer electrolyte diffuses into the pores of the porous electrode to form the composite electrolyte-electrode. In order to enhance the diffusion, the solid polymer electrolyte preferably is applied while the electrode is still warm. Most preferably, the melt-coating is performed at a temperature (e.g. 130° C.) where the viscosity of the solid polymer electrolyte composition is low enough to permit rapid diffusion into the pores of the electrode. The solid polymer electrolyte can be applied either by a single application or by multiple applications, in sufficient amount to both fill the pore volume of the electrode and provide a coating thereon. The porous electrode and the diffused solid polymer electrolyte then cool to form the final composite electrolyte-electrode product.

The present invention provides composite electrolyte-electrodes fabricated according to the processes above. The composite electrolyte-electrodes can be either a cathode or an anode. The composite electrolyte-electrodes can then be formed into batteries 16.

This invention provides for electrode products having enhanced interfacial relationship between the SPE and electrode and provide a battery exhibiting lower impedance than those formed from electrode and SPE sheet materials, as conventionally known.

The following specific examples are provided by way of illustration, and are not meant to be a limitation on the invention as defined by the claims appended hereto. All parts and percentages are by weight unless otherwise indicated.

EXAMPLE 1

A polyethylene-based electrode is produced by extruding polyethylene mixed with a pore former such as a hydrocarbon oil and a solid which acts as the active material (graphite for the anode and $MN_2O_4$ or other metal oxide for the cathode, for example). The electrode is comprised of the materials outlined plus a current collector which is either co-extruded with the active material in a cross-head die or laminated to the electrode material after extraction. When using a coextrusion current collector, the collector is a mesh material to allow extraction.

After extrusion of the electrode material, the pre-formed electrode (oil, polyethylene and solid) is extracted with a solvent, such as hexane or a chlorinated hydrocarbon, for example, to remove the pore forming oil, which is recycled. The porous electrode can be stored at ambient conditions prior to further use.

The porous electrode and current collector is fed into a glove box containing a dry atmosphere where it is heated to remove residual water. The electrode is then melt coated with a solid polymer electrolyte composition of the following formulation: The SPE is coated onto the electrode at 130° C. where the viscosity is low enough to permit rapid diffusion into the pores of the electrode. The resultant product contains electrolyte within the pores of the electrode to provide an electrolyte-electrode composite product.

EXAMPLE 2

A layer of solid polymer electrolyte for coating onto a composite electrolyte-electrode of Example Ihas the following formulation:

| Component | weight % |
| --- | --- |
| LiPF$_6$ salt | 14 |
| Polyacrylonitrile | 11 |
| Ethylene carbonate/ propylene carbonate | 75 |

The electrolyte-cathode film from Example 1 is coated with a film of the extruded solid polymer electrolyte above to form a laminate of solid polymer electrolyte and composite electrolyte-electrode that is ready for assembly into cells, to form a battery, for example. Preferably, the solid polymer electrolyte and the extruded composite electrolyte-electrode layer are still warm when they are brought together.

Advantageously, substantial intermixing takes place at the interface of the cathode composition and the solid polymer electrolyte when the two similarly-composed extrusion layers are brought into contact while still warm. Accordingly, the surfaces of the two layers blend together to form an "interfaceless" laminate that is ready for assembly into cells. As a further advantage, the solid polymer electrolyte layer acts as a separator for the cathode.

Although the present invention has been described in relation to particular embodiments thereof, many other variations and modifications and other uses will become apparent to those skilled in the art. The present invention is to be limited not by the specific disclosure herein, but only by the appended claims.

What is claimed is:

1. A process for forming a solid polymer electrolyte-electrode composite comprising the steps of:

forming an electrode comprising active material, binder and porogen;

removing at least a portion of the porogen to provide a porous electrode;

applying to the porous electrode a fluid, low viscosity mixture of components of a solid polymer electrolyte composition comprising electrolyte salt, polymer binder and electrolyte liquid, said application being conducted at an elevated temperature sufficient to cause said composition to be a fluid, low viscosity mixture, and said binder of the solid polymer electrolyte has a lower melt (deformation onset) thermal properties than the binder of the electrode;

diffusing the applied electrolyte mixture into the pores of the electrode to form a composite product; and cooling the composite product, the solid polymer electrolyte being entrapped in the porous electrode.

2. The process of claim 1, wherein the porous electrode comprises active material composed of at least one electrically conductive and at least one electrochemically active material.

3. The process of claim 2, wherein the binder of the electrode is a thermoplastic polymer having a melting point above about 150° C.

4. The process of claim 1, wherein the electrode binder component comprises at least one polyolefin.

5. The process of claim 1, wherein the electrolyte salt is at least one lithium salt.

6. The process of claim 1, wherein the polymer binder of the solid polymer electrolyte comprises the polyethylene oxide, polyacrylonitrile or polyvinylidene difluoride or mixtures thereof.

7. The process of claim 1, further comprising extruding the electrode onto a metallic current collector.

8. The process of claim 1 wherein the active material of said electrode comprises carbon.

9. The process of claim 1 wherein the active material of said electrode comprises a light-weight metal or a light-weight metal chalcogenide.

10. The process of claim 9, wherein the metal is an alkali metal.

11. The process of claim 1, further comprising the step of removing residual water.

12. The process of claim 1, wherein the step of applying is performed at a temperature at which the viscosity of the solid polymer electrolyte is low enough to permit rapid diffusion into the pores of the electrode.

13. The process of claim 1, further comprising the step of over-coating the cooled composite product with a polymeric separator.

14. The process of claim 13, wherein the polymer separator is electronically non-conductive at all temperatures.

15. The process of claim 14, wherein the polymer separator composition includes a salt, a solvent, and a polymer selected from the group consisting of polyethylene oxide, polyacrylonitrile, and polyvinylidene fluoride.

16. The process of claim 13, wherein both the solid polymer electrolyte and the polymeric separator include the same polymer, solvent, and lithium salt.

17. The process of claim 15, wherein the solid polymer electrolyte comprises polyacrylonitrile.

18. The process of claim 2, wherein the solid active electrode material is in the form of a particulate.

19. The process of claim 8, wherein the active electrode material is carbon capable of intercalating lithium ions.

* * * * *